R. E. LAIRD & J. H. RANEY.
APPARATUS FOR DEHYDRATING PETROLEUM OIL.
APPLICATION FILED OCT. 26, 1914.
1,142,761.
Patented June 8, 1915.
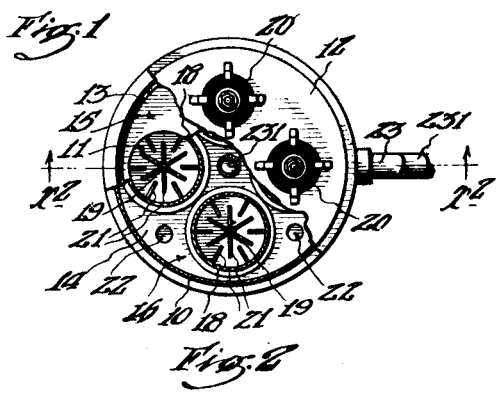
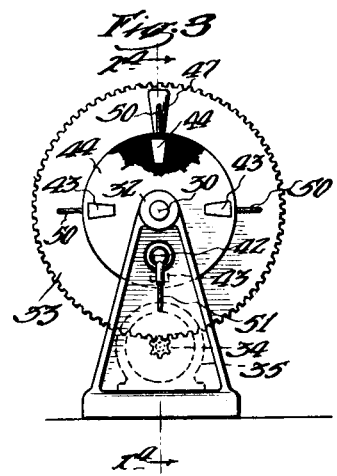
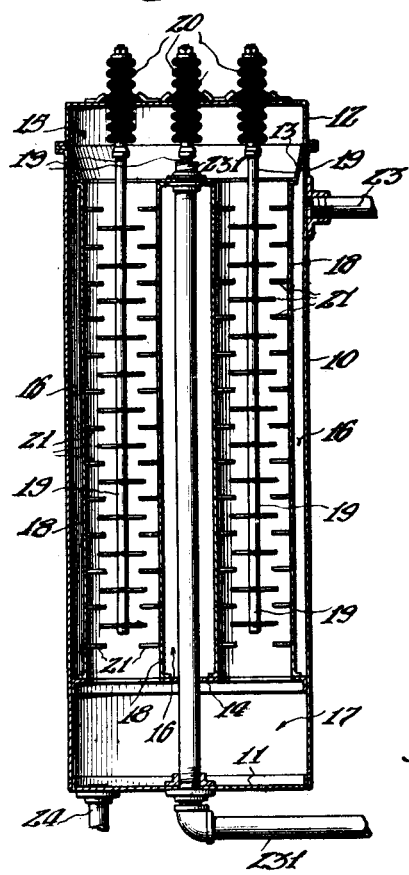
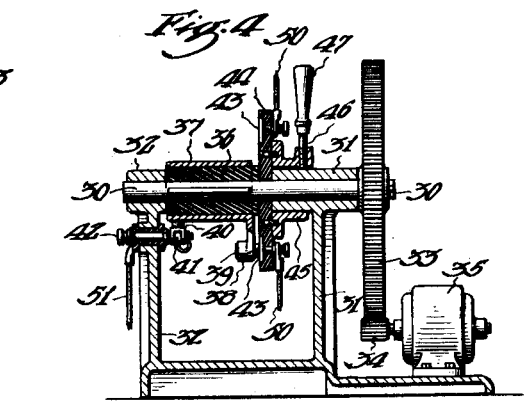
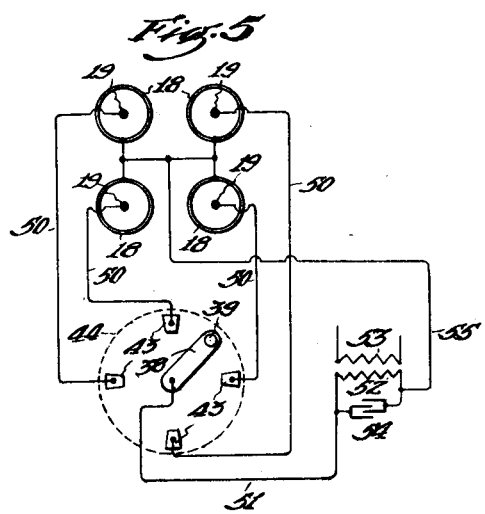
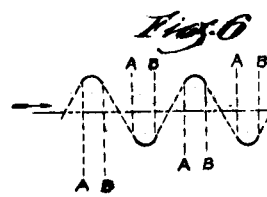

UNITED STATES PATENT OFFICE.

ROBERT E. LAIRD AND JOSEPH H. RANEY, OF TAFT, CALIFORNIA, ASSIGNORS TO RANEY-LAIRD PETROLEUM DEHYDRATING COMPANY, OF LOS ANGELES, CALIFORNIA, A CORPORATION OF CALIFORNIA.

APPARATUS FOR DEHYDRATING PETROLEUM-OIL.

1,142,761.  Specification of Letters Patent.  Patented June 8, 1915.

Application filed October 26, 1914. Serial No. 868,774.

*To all whom it may concern:*

Be it known that we, ROBERT E. LAIRD and JOSEPH H. RANEY, citizens of the United States, both residing at Taft, in the county of Kern and State of California, have invented a new and useful Apparatus for Dehydrating Petroleum-Oil, of which the following is a specification.

The invention relates to the art of dehydrating crude petroleum, and the principal object of the invention is to provide a process and apparatus which will remove the water from petroleum emulsions.

Crude petroleum in its natural state is often found mixed with water. This water appears in two forms; first, as free water which will readily settle out if the mixture is allowed to stand, and, second, as trapped or emulsified water which will not settle out even if the mixture is allowed to stand for long periods. The emulsion consists of very minute particles of water embedded in the mass of oil, and the principal object of our invention is to break up the films between the various water particles so that they will coalesce into larger globules of free water. We have found that this can be done by causing very heavy currents to flow momentarily through the body of emulsion and interrupting these currents at regular intervals to allow the free water to settle out of the mass of oil. We have further found that an alternating current is well suited to this work, and we provide a distributer whereby an alternating electromotive force may be intermittently impressed upon suitable electrodes immersed in the emulsion. We have also found that by driving this distributer in synchronism with the source of alternating electromotive force, and by so adjusting the distributer that only the extreme peaks of the alternating wave are utilized, that large power economies are possible over previous methods, such as those disclosed by us in our application for patent Serial No. 852,483, for apparatus for treating emulsions, filed by us on July 22, 1914, and now pending before the United States Patent Office.

A further object of our invention is to connect the distributer to a synchronous motor and to provide adjusting means on the distributer so that the peaks of the voltage wave are utilized in breaking down the films of oil between the water particles to coalesce them into free globules.

We have further found that by connecting a condenser across the terminals of the treaters that a further power economy is possible, and a further object of our invention is to provide such a condenser.

Referring to the drawings, which are for illustrative purposes only, Figure 1 is a plan view of the treater, a portion thereof being broken away and shown in section to better illustrate the internal structure. Fig. 2 shows a section on the plane $x^2$—$x^2$ of Fig. 1. Fig. 3 is an end elevation of a distributer. Fig. 4 is a partial section on the plane $x^4$—$x^4$ of Fig. 3. Fig. 5 is a diagram of connections of the apparatus, and Fig. 6 is a graphical representation of the alternating voltage wave.

In our invention we employ a treater which consists of an outer shell 10 having a tight bottom 11 and a removable top 12. Secured in the shell 10 is a pan 13 and a dividing wall 14, the pan and wall dividing the interior of the treater into an upper chamber 15, a central chamber 16 and a lower chamber 17. Secured in the pan 13 and the wall 14 are a plurality of cylindrical outer electrodes 18, these electrodes having a tight closure with the pan 13 and the wall 14 and providing an open passage therethrough between the chambers 15 and 17. An inner electrode 19 is suspended in the center of each of the outer electrodes 18, being secured in an insulator 20 carried by the top 12 of the treater. Extending outwardly from the electrodes 19 and inwardly from the electrodes 18 are a series of points 21 between which the electrical discharge takes place through the emulsion. A series of openings 22 are provided in the wall 14 providing open passages between the chambers 16 and 17. An emulsion inlet pipe 23 opens into the top of the chamber 16 and an oil outlet pipe 231 extends upwardly through the bottom 11, through the wall 14, and through the pan 13 into the upper chamber 15. A water outlet pipe 24 is tightly secured in the bottom 11, opening into the chamber 17. Emulsion is admitted through the pipe 23, flowing downwardly through the chamber 16 around the outer electrodes 18 and through the openings 22 into the chamber 17, thereafter passing upwardly through the outer electrodes 18 into the chamber 15 between the points 21. In its passage through the outer electrodes 18, the emulsion is separated into free oil and free water, the free oil rising and passing outwardly through the pipe 231 and the water falling and being drawn off through the pipe 24.

The particular form of treater above described is adopted for illustrative purposes only and forms no part of the present invention, being fully illustrated and described in our application for patent Serial No. 852,482, filed by us on July 22, 1914.

For the purpose of regulating and controlling the electromotive force impressed on the electrodes 18 and 19, the distributer illustrated in Figs. 3 and 4 may be used. This distributer consists of a shaft 30 carried in suitable bearings 31 and 32 and driven by means of a gear 33 from a pinion 34 on a synchronous motor 35. This synchronous motor may be of any of the well known forms, the only requirement being that its speed of rotation be an exact divisor of the frequency of the source of electricity. Rigidly secured to the shaft 30 is an insulating sleeve 36 upon which is mounted a collector ring 37 which carries an arm 38 having a moving contact brush 39 elastically secured therein. A stationary contact brush 40 carried in a brush holder 41 on a stud 42 makes contact with the ring 37 and is suitably insulated from and secured to the bearing 32. The moving contact brush 39 is so placed as to successively contact with a series of stationary contacts 43 which are rigidly secured in an insulating plate 44 carried on a sleeve 45 mounted on the bearing 31. Threaded in the sleeve 45 is a stud 46 having an insulating handle 47 formed thereon, the purpose of the stud 46 and the handle 47 being to secure the sleeve 45 in various angular positions about the bearing 31, the stud 46 being rotated by the handle to press against the bearing 31 and lock the sleeve 45 in any angular position.

The method of connection is illustrated in Fig. 5 in which four outer electrodes 18 are shown, each having its inner electrode 19 connected through a suitable wire 50 with one of the segments 43 of the distributer. The moving arm 38 and the brush 39 are connected through a wire 51 with a secondary 52 of a transformer having a primary 53 connected to the alternating source of electricity. Connected across the secondary 52 is a condenser 54, the secondary 52 and the condenser 54 being connected through a wire 55 with all of the outer electrodes 18.

The method of operation of the invention is as follows: The emulsion being circulated through the treater, as previously described, alternating electromotive force is impressed at a certain frequency through a suitable source on the primary 53 of the transformer. This in turn induces a similar electromotive force of the same frequency on the secondary 52 of the transformer, and this electromotive force is impressed through the wires 51 and 55 on the outer electrodes 18 and on the moving contact brush 39. Since the moving contact brush 39 is connected through the shaft 30 and the gear 33 and the pinion 34 with the synchronous motor 35, the brush 39 will move in exact synchronism with the source of electric power and it will make contact with each of the segments 43 at a certain definite place in the voltage wave which is graphically shown in Fig. 6, in which horizontal distances represent time and vertical distances represent magnitude of electromotive force. The sleeve 45 is suitably adjusted by means of the handle 47 and the stud 46 so that the moving contact brush 39 makes contact with one of the segments 43 at an instant marked A in Fig. 6, and that it breaks contact at the instant marked B in Fig. 6. The result is that only those portions of the electromotive force wave shown in full lines in Fig. 6 are impressed upon the electrodes 18 and 19, a current flowing between the electrodes 18 and 19 during the interval represented by the instances marked A, B, graphically shown in Fig. 6. The result is that only the extreme peak of maximum value of the voltage wave acts upon the emulsion, and as soon as this wave starts to decrease connection is broken and the current ceases, thus allowing the trapped water which has been broken up by the current to separate into large globules and drop out of the electric field between the electrodes 18 and 19.

The synchronous motor may be of any desired form. A common one is that having a direct current field winding and an alternating current armature. Such motors run in exact synchronism with the supply circuit as contrasted with the ordinary induction motors which run slightly slower, the difference in speed in induction motors being known as the slip. The distributer shown is largely diagrammatic, there being generally more contacts 43 as a complete treating plant will generally consist of at least 16 inner electrodes. In some cases where a high frequency is used the distributer is directly connected to the armature shaft of the synchronous motor. In the case of a 25 cycle distributer having four contacts 43 we prefer to run the motor 35 at 1500 R. P. M. and the shaft 30 at 750 R. P. M. or 12½ R. P. S. with four contacts 43, this gives us 50 makes and breaks per second or one per alternation. With 16 treaters the gear ratio would be 8 to 1, the shaft 30 running only 187½ R. P. M. or 3.125

R. P. S. This multiplied by 16 contacts gives us 50 makes and breaks per second or one per alternation. It is not however necessary and in many cases not desirable to make contact every alternation. Some of the waves may be skipped and every second, third, or fourth wave used. T , treaters operate perfectly under these cor itions and there is no increase in power consumption.

The function of the condenser 54 is to store energy during the dotted portion of the wave and to discharge this energy between the electrodes during the solid portion, so that a much heavier and more efficient discharge takes place and so that the arcing at the contacts 43 is greatly reduced. It is to be understood that the form of distributer illustrated in Figs. 3 and 4 is selected for illustrative purposes only, being largely diagrammatic, and that in the actual practice of our invention we have often found it necessary to provide distributers which have heavy porcelain insulation and are considerably more complicated and expensive than the one illustrated. The construction of such distributers forms no part of the present invention, and we have not attempted to illustrate or describe any of the various refinements thereof which we have developed in practising our invention.

Our invention then consists broadly in the synchronous operation of the distributer and the source of electrical energy, so that a certain portion of each voltage wave is utilized for producing a current between the electrodes.

The invention consists further in the use of a condenser for the purpose of increasing the violence of the current which flows between the electrodes, and further in the combination of the synchronous motor driven distributer with such a condenser.

It consists further in the provision of means whereby any portion of the voltage wave may be selected for use in causing currents to flow between the electrodes, the peak of the wave being ordinarily utilized for this purpose.

We therefore desire only such limitations to be placed upon our invention as are indicated by the attached claims, as the apparatus described is largely diagrammatic, the specific details of which form no part of the present invention.

What we claim is:—

1. Apparatus for treating petroleum emulsions comprising a treater equipped with suitable electrodes, means for introducing an emulsion of petroleum oil and water to said treater, means for withdrawing oil and water from said treater, a source of alternating electromotive force, a distributer for connecting and disconnecting said source to said electrodes, and means for driving said distributer in such a manner that the same relative portion of each alternation of the electromotive force is impressed on the electrodes.

2. Apparatus for treating petroleum emulsions comprising a treater equipped with suitable electrodes, means for introducing an emulsion of petroleum oil and water to said treater, means for withdrawing oil and water from said treater, a source of alternating electromotive force, a distributer for connecting and disconnecting said source to said electrodes, and means for driving said distributer in synchronism with said alternating electromotive force.

3. Apparatus for treating petroleum emulsions comprising a treater equipped with suitable electrodes, means for introducing an emulsion of petroleum oil and water to said treater, means for withdrawing oil and water from said treater, a source of alternating electromotive force, a distributer for connecting and disconnecting said source to said electrodes, and a synchronous motor for driving said distributer in such a manner that the same relative portion of each alternation of the electromotive force is impressed on the electrodes.

4. Apparatus for treating petroleum emulsions comprising a treater equipped with suitable electrodes, means for introducing an emulsion of petroleum oil and water to said treater, means for withdrawing oil and water from said treater, a source of alternating electromotive force, a distributer for connecting and disconnecting said source to said electrodes, a synchronous motor connected to said source and driving said distributer in synchronism with said source, and means for adjusting said distributer in such a manner as to utilize a certain portion of each alternation.

5. Apparatus for treating petroleum emulsions comprising a treater equipped with suitable electrodes, means for introducing an emulsion of petroleum oil and water to said treater, means for withdrawing oil and water from said treater, a source of alternating electromotive force, a distributer for connecting and disconnecting said source to said electrodes, a synchronous motor connected to said source and driving said distributer in synchronism with said source, and means for adjusting said distributer in such a manner that the top of each alternating electromotive force wave is impressed on the electrodes.

6. Apparatus for treating petroleum emulsions comprising a treater equipped with suitable electrodes, means for introducing an emulsion of petroleum oil and water to said treater, means for withdrawing oil and water from said treater, a source of alternating electromotive force, a distributer for connecting and disconnecting said source to  id electrodes, a synchronous motor connected to said source and driving said distributer in synchronism with said source, a condenser connected across the electrodes of said treater, and means for adjusting said distributer in such a manner as to utilize a certain portion of each alternation.

7. Apparatus for treating petroleum emulsions comprising a treater equipped with suitable electrodes, means for introducing an emulsion of petroleum oil and water to said treater, means for withdrawing oil and water from said treater, a source of alternating electromotive force, a distributer for connecting and disconnecting said source to said electrodes, a synchronous motor connected to said source and driving said distributer in synchronism with said source, a condenser connected across the electrodes of said treater, and means for adjusting said distributer in such a manner that the top of each alternating electromotive force wave is impressed on the electrodes.

In testimony whereof, we have hereunto set our hands at Taft, California, this 16th day of October, 1914.

ROBERT E. LAIRD.
JOSEPH H. RANEY.

In presence of—
L. B. LITTLE,
A. B. GREEN.